United States Patent
Kunisawa

(10) Patent No.: US 12,420,588 B2
(45) Date of Patent: Sep. 23, 2025

(54) TIRE

(71) Applicant: Sumitomo Rubber Industries, Ltd., Hyogo (JP)

(72) Inventor: Tetsuya Kunisawa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 710 days.

(21) Appl. No.: 17/439,343

(22) PCT Filed: Feb. 12, 2020

(86) PCT No.: PCT/JP2020/005262
§ 371 (c)(1),
(2) Date: Sep. 14, 2021

(87) PCT Pub. No.: WO2020/189100
PCT Pub. Date: Sep. 24, 2020

(65) Prior Publication Data
US 2022/0176744 A1 Jun. 9, 2022

(30) Foreign Application Priority Data
Mar. 19, 2019 (JP) .................. 2019-051243

(51) Int. Cl.
| | |
|---|---|
| *B60C 1/00* | (2006.01) |
| *B60C 11/00* | (2006.01) |
| *B60C 11/03* | (2006.01) |
| *B60C 11/13* | (2006.01) |
| *C08K 3/36* | (2006.01) |
| *C08L 9/06* | (2006.01) |
| *C08L 21/00* | (2006.01) |

(52) U.S. Cl.
CPC .......... *B60C 1/0016* (2013.01); *B60C 11/00* (2013.01); *B60C 11/13* (2013.01); *C08K 3/36* (2013.01); *C08L 9/06* (2013.01); *C08L 21/00* (2013.01); *B60C 2011/0353* (2013.01); *B60C 2011/0355* (2013.01); *B60C 2200/04* (2013.01); *C08K 2201/006* (2013.01); *Y02T 10/86* (2013.01)

(58) Field of Classification Search
CPC ....... B60C 1/0016; B60C 11/13; B60C 11/00; B60C 2011/0353; B60C 2011/0355; B60C 2200/04; C08K 3/36; C08K 2201/006; C08L 9/06; C08L 21/00; Y02T 10/86

See application file for complete search history.

(56) References Cited

U.S. PATENT DOCUMENTS

| | | | |
|---|---|---|---|
| 2008/0223494 A1* | 9/2008 | Amino | C08L 9/06 152/209.1 |
| 2012/0016056 A1* | 1/2012 | Miyazaki | C08L 9/06 523/156 |
| 2013/0331498 A1 | 12/2013 | Miyazaki | |
| 2013/0338255 A1* | 12/2013 | Naka | C08L 7/00 523/155 |
| 2016/0052340 A1 | 2/2016 | Miyazaki et al. | |
| 2018/0093533 A1 | 4/2018 | Yokoyama et al. | |
| 2018/0327572 A1 | 11/2018 | Maekawa | |
| 2019/0136019 A1 | 5/2019 | Kushida | |
| 2020/0148004 A1 | 5/2020 | Suzuki et al. | |

FOREIGN PATENT DOCUMENTS

| | | |
|---|---|---|
| CN | 103483636 A | 1/2014 |
| CN | 107383493 A | 11/2017 |
| EP | 2 740 757 A1 | 6/2014 |
| EP | 2 749 404 A1 | 7/2014 |
| EP | 3 279 012 A1 | 2/2018 |
| EP | 3 572 460 A1 | 11/2019 |
| JP | 2016-037556 A | 3/2016 |
| JP | 2017-203125 A | 11/2017 |
| JP | 2018-053179 A | 4/2018 |
| JP | 2018-145271 A | 9/2018 |
| JP | 2018-188566 A | 11/2018 |
| WO | 2014/178336 A1 | 11/2014 |
| WO | 2018/135530 A1 | 7/2018 |
| WO | 2019/017417 A1 | 1/2019 |

OTHER PUBLICATIONS

International Search Report issued in PCT/JP2020/005262; mailed Apr. 28, 2020.

* cited by examiner

*Primary Examiner* — Patrick D Niland
(74) *Attorney, Agent, or Firm* — Studebaker Brackett PLLC

(57) ABSTRACT

The present invention aims to provide tires which provide improved overall performance in terms of fuel economy, life performance, wet grip performance, and handling stability. The present invention relates to a tire including a tread, the tread containing a rubber component, a silica having a nitrogen adsorption specific surface area of 200 m²/g or more, and a softener, the tread satisfying the following relationship (A):

0.25≤total silica content(parts by mass)/(total softener content(parts by mass)×main groove depth (mm))≤0.60.

12 Claims, 1 Drawing Sheet

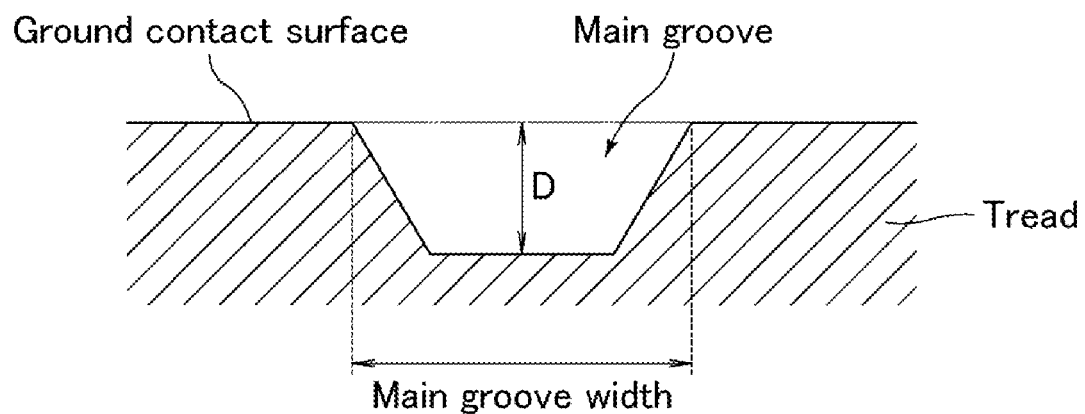

TIRE

TECHNICAL FIELD

The present invention relates to tires.

BACKGROUND ART

In recent years, it has become desirable for tires to have reduced rolling resistance and improved life performance in view of environmental issues and economic efficiency. It is also necessary to improve wet grip performance and handling stability from a safety standpoint. Decreasing the amount of filler such as silica or carbon black may reduce rolling resistance, but unfortunately can reduce reinforcement, life performance, and wet grip performance (see, for example, Patent Literature 1). Thus, the prior art leaves room for improvement in enhancing overall performance in terms of rolling resistance (fuel economy), life performance, wet grip performance, and handling stability.

CITATION LIST

Patent Literature

Patent Literature 1: JP 2018-145271 A

SUMMARY OF INVENTION

Technical Problem

The present invention aims to solve the above problem and provide tires which provide improved overall performance in terms of fuel economy, life performance, wet grip performance, and handling stability.

Solution to Problem

The present invention relates to a tire, including a tread, the tread containing:
a rubber component;
a silica having a nitrogen adsorption specific surface area of 200 m²/g or more; and
a softener,
the tread satisfying the following relationship (A):

0.25≤total silica content(parts by mass)/(total softener content(parts by mass)×main groove depth (mm))≤0.60.

The upper limit in relationship (A) is preferably 0.55 or lower, more preferably 0.50 or lower, still more preferably 0.48 or lower.

The lower limit in relationship (A) is preferably 0.30 or higher, more preferably 0.35 or higher, still more preferably 0.43 or higher.

The main groove depth is preferably 7.5 mm or less, more preferably 6.5 mm or less, still more preferably 5.5 mm or less.

The total silica content is preferably 70 parts by mass or higher, more preferably 80 parts by mass or higher, still more preferably 90 parts by mass or higher, per 100 parts by mass of the rubber component.

Advantageous Effects of Invention

The tires of the present invention include a tread which contains a rubber component, a silica having a nitrogen adsorption specific surface area of 200 m²/g or more, and a softener, and which satisfies relationship (A). Such tires have improved overall performance in terms of fuel economy, life performance, wet grip performance, and handling stability.

BRIEF DESCRIPTION OF DRAWINGS

FIG. 1 is a schematic view of a main groove.

DESCRIPTION OF EMBODIMENTS

The tires of the present invention include a tread which contains a rubber component, a silica having a nitrogen adsorption specific surface area of 200 m²/g or more, and a softener, and which satisfies the relationship (A) below. Thus, the tires have improved overall performance in terms of fuel economy, life performance, wet grip performance, and handling stability.

0.25≤total silica content(parts by mass)/(total softener content(parts by mass)×main groove depth (mm))≤0.60     (A)

The tires provide the above-mentioned effect. The reason for this advantageous effect is not exactly clear but may be explained as follows.

After extensive studies, the present inventor has decided to investigate improvements in the above-mentioned overall performance by varying not only the rubber compound of the tread but also the main groove depth.

The inventor first investigated the use of a silica having a nitrogen adsorption specific surface area of 200 m²/g or more (fine particle silica) in a tread rubber. Fine particle silica has a large specific surface area and therefore a large number of reactive sites with respect to polymers, which is advantageous for improving fuel economy and life performance. However, the inventor has found that the use of fine particle silica may increase the viscosity of the unvulcanized rubber and thus cause higher heat build-up during the extrusion of a tread rubber, so that scorching is likely to occur. Then, the present inventor tried to reduce the viscosity by increasing the total softener content. However, it turned out that the hardness of the vulcanized rubber was reduced, and thus the tread rigidity and handling stability were deteriorated. Next, the inventor tried reducing the thickness of the tread, which was found to reduce the occurrence of scorching, but affect life performance. Therefore, the present inventor has discovered that the overall performance in terms of fuel economy, life performance, wet grip performance, and handling stability may be improved by balancing the total silica content, total softener content, and tread thickness (main groove depth), specifically by satisfying relationship (A).

As described above, by incorporating fine particle silica and further satisfying relationship (A), the tread can have an excellent balance of total silica content, total softener content, and tread thickness (main groove depth), thereby providing improved overall performance in terms of fuel economy, life performance, wet grip performance, and handling stability.

Thus, the present invention solves the problem (purpose) consisting in improving overall performance in terms of fuel economy, life performance, wet grip performance, and handling stability by a tread structure satisfying the parameter of relationship (A). Specifically, the parameter does not define the problem (purpose). The problem to be solved by the invention is to improve overall performance in terms of fuel economy, life performance, wet grip performance, and handling stability. In order to provide a solution to this problem, a tread structure satisfying the parameter of relationship (A) has been devised. In other words, the essential feature is to satisfy the parameter of relationship (A).

Herein, the total silica content (parts by mass) refers to the total amount of silica per 100 parts by mass of the rubber component.

Herein, the total softener content (parts by mass) refers to the total amount of softeners per 100 parts by mass of the rubber component.

Herein, the term "softener" refers to an agent capable of softening rubber, and examples include oils, liquid diene polymers, resins, and ester plasticizers.

Herein, the term "main groove" means the widest (widest in the tire width direction) groove among the grooves provided along the tire circumferential direction. When there are two or more widest grooves, the main groove refers to the one closer to the widthwise center of the tire. When two grooves correspond to such main grooves, or in other words when there are two such main grooves located at the same distance from the widthwise center of the tire, the main groove refers to the deeper one.

Herein, the term "main groove depth" is measured relative to a plane (ground contact surface) along which the tread is horizontal to the width direction, and refers to the distance between the deepest groove bottom and the ground contact surface (plane extending from the ground contact surface) along a perpendicular line drawn in the tire radial direction from a position one half the width of the main groove on the ground contact surface (plane extending from the ground contact surface). In FIG. 1, the main groove depth means the length D.

The tires preferably have a main groove depth of 10 mm or less, more preferably 7.5 mm or less, still more preferably 7.0 mm or less, particularly preferably 6.5 mm or less, most preferably 6.0 mm or less, further most preferably 5.5 mm or less, but preferably 3.5 mm or more, more preferably 4.0 mm or more, still more preferably 4.5 mm or more, particularly preferably 5.0 mm or more, most preferably 5.3 mm or more. When the main groove depth is within the range indicated above, the advantageous effect tends to be more suitably achieved.

The tires preferably have a main groove width (width in the tire width direction) of 16 mm or less, more preferably 14 mm or less, still more preferably 12 mm or less, but preferably 6 mm or more, more preferably 7 mm or more, still more preferably 8 mm or more. When the main groove width is within the range indicated above, the advantageous effect tends to be more suitably achieved.

As shown in relationship (A), the value of [total silica content (parts by mass)/(total softener content (parts by mass)×main groove depth (mm))] is 0.60 or lower, preferably 0.56 or lower, more preferably 0.55 or lower, still more preferably 0.53 or lower, particularly preferably 0.52 or lower, most preferably 0.50 or lower, further preferably 0.48 or lower. The lower limit is 0.25 or higher, preferably 0.28 or higher, more preferably 0.30 or higher, still more preferably 0.31 or higher, particularly preferably 0.35 or higher, most preferably 0.36 or higher, further preferably 0.37 or higher, further preferably 0.38 or higher, further preferably 0.40 or higher, further preferably 0.43 or higher. When the value is within the range indicated above, the advantageous effect tends to be more suitably achieved.

The relationship (A) can be satisfied by appropriately controlling the total silica content (parts by mass), total softener content (parts by mass), and main groove depth (mm).

Chemicals that may be used in the rubber composition for forming the tread rubber specified above (also referred to as rubber composition) are described below.

Examples of the rubber component include diene rubbers such as isoprene-based rubbers, polybutadiene rubber (BR), styrene-butadiene rubber (SBR), styrene-isoprene-butadiene rubber (SIBR), acrylonitrile-butadiene rubber (NBR), chloroprene rubber (CR), and butyl rubber (IIR). The rubber component may include a single rubber or a combination of two or more rubbers. Among these, diene rubbers are preferred, isoprene-based rubbers, BR, and SBR are more preferred, and BR and SBR are still more preferred.

The rubber component preferably includes a rubber having a weight average molecular weight (Mw) of 150,000 or more, more preferably 350,000 or more. The upper limit of the Mw is not limited but is preferably 4,000,000 or less, more preferably 3,000,000 or less.

The amount of diene rubbers based on 100% by mass of the rubber component is preferably 20% by mass or more, more preferably 50% by mass or more, still more preferably 70% by mass or more, particularly preferably 80% by mass or more, most preferably 90% by mass or more, and may be 100% by mass. When the amount is within the range indicated above, the advantageous effect tends to be better achieved.

Any SBR may be used. Examples include those commonly used in the tire industry, such as emulsion-polymerized SBR (E-SBR) and solution-polymerized SBR (S-SBR). These may be used alone or in combinations of two or more.

The SBR preferably has a styrene content of 10% by mass or higher, more preferably 15% by mass or higher, still more preferably 20% by mass or higher, particularly preferably 25% by mass or higher, but preferably 50% by mass or lower, more preferably 45% by mass or lower, still more preferably 40% by mass or lower, particularly preferably 30% by mass or lower. When the styrene content is within the range indicated above, the advantageous effect tends to be more suitably achieved.

The SBR may be either nonmodified or modified SBR. Modified SBR is preferred among these. The use of modified SBR provides better fuel economy.

The modified SBR may be any SBR having a functional group interactive with filler such as silica. For example, it may be a chain end-modified SBR obtained by modifying at least one chain end of SBR with a compound (modifier) having the functional group (i.e., a chain end-modified SBR terminated with the functional group); a backbone-modified SBR having the functional group in the backbone; a backbone- and chain end-modified SBR having the functional group in both the backbone and chain end (e.g., a backbone- and chain end-modified SBR in which the backbone has the functional group and at least one chain end is modified with the modifier); or a chain end-modified SBR that has been modified (coupled) with a polyfunctional compound having two or more epoxy groups in the molecule so that a hydroxy or epoxy group is introduced. These may be used alone or in combinations of two or more.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may have a substituent group. Preferred among these are amino (preferably amino whose hydrogen atom is replaced with a C1-C6 alkyl group), alkoxy (preferably C1-C6 alkoxy), alkoxysilyl (preferably C1-C6 alkoxysilyl), and amide groups.

SBR products manufactured or sold by Sumitomo Chemical Co., Ltd., JSR Corporation, Asahi Kasei Corporation, Zeon Corporation, etc. may be used as the SBR.

The amount of SBR based on 100% by mass of the rubber component is preferably 20% by mass or more, more preferably 50% by mass or more, still more preferably 65% by mass or more, but is preferably 90% by mass or less, more preferably 85% by mass or less. When the amount is within the range indicated above, the advantageous effect tends to be better achieved.

Any BR may be used. Examples include those commonly used in the tire industry. These may be used alone or in combinations of two or more.

The BR preferably has a cis content of 90% by mass or higher, more preferably 95% by mass or higher, still more preferably 97% by mass or higher. The upper limit of the cis content is not limited and may be 100% by mass. When the cis content is within the range indicated above, the advantageous effect tends to be more suitably achieved.

The BR may be either nonmodified or modified BR. Examples of the modified BR include those into which the above-mentioned functional groups are introduced. Preferred embodiments of the modified BR are as described for the modified SBR.

The BR may be commercially available from Ube Industries, Ltd., JSR Corporation, Asahi Kasei Corporation, Zeon Corporation, etc.

The amount of BR based on 100% by mass of the rubber component is preferably 10% by mass or more, more preferably 15% by mass or more, but is preferably 80% by mass or less, more preferably 50% by mass or less, still more preferably 35% by mass or less. When the amount is within the range indicated above, the advantageous effect tends to be more suitably achieved.

Examples of isoprene-based rubbers include natural rubber (NR), polyisoprene rubber (IR), refined NR, modified NR, and modified IR. The NR may be one commonly used in the tire industry, such as SIR20, RSS #3, or TSR20. Any IR may be used, and examples include those commonly used in the tire industry, such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone or in combinations of two or more. NR is preferred among these.

The amount of isoprene-based rubbers based on 100% by mass of the rubber component is preferably 5% by mass or more, more preferably 10% by mass or more, but is preferably 40% by mass or less, more preferably 30% by mass or less.

Herein, the weight average molecular weight (Mw) and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The cis content (cis-1,4-butadiene unit content) and vinyl content (1,2-butadiene unit content) can be determined by infrared absorption spectrometry. The styrene content can be determined by $^1$H-NMR analysis.

The rubber composition for forming the tread rubber contains a silica having a nitrogen adsorption specific surface area of 200 m$^2$/g or more (fine particle silica). The silica may include a single type of silica or a combination of two or more types of silica.

Examples of the silica include dry silica (anhydrous silicic acid) and wet silica (hydrous silicic acid). Wet silica is preferred because it has a large number of silanol groups.

The fine particle silica has a nitrogen adsorption specific surface area (N$_2$SA) of 200 m$^2$/g or more, preferably 205 m$^2$/g or more, more preferably 210 m$^2$/g or more, still more preferably 215 m$^2$/g or more, particularly preferably 220 m$^2$/g or more, most preferably 225 m$^2$/g or more, further most preferably 230 m$^2$/g or more. The N$_2$SA is also preferably 600 m$^2$/g or less, more preferably 300 m$^2$/g or less, still more preferably 250 m$^2$/g or less, particularly preferably 240 m$^2$/g or less. When the N$_2$SA is within the range indicated above, the advantageous effect tends to be more suitably achieved.

Herein, the N$_2$SA of the silica is measured by the BET method in accordance with ASTM D3037-81.

The amount of the fine particle silica per 100 parts by mass of the rubber component is preferably 10 parts by mass or more, more preferably 40 parts by mass or more, still more preferably 60 parts by mass or more, particularly preferably 70 parts by mass or more, most preferably 80 parts by mass or more, further most preferably 90 parts by mass or more, but is preferably 120 parts by mass or less, more preferably 115 parts by mass or less, still more preferably 110 parts by mass or less, particularly preferably 105 parts by mass or less, most preferably 100 parts by mass or less. When the amount is within the range indicated above, the advantageous effect tends to be more suitably achieved.

The rubber composition may contain an additional type of silica different from the fine particle silica. The additional type of silica may include a single type of silica or a combination of two or more types of silica. The additional type of silica different from the fine particle silica preferably has a N$_2$SA of 50 m$^2$/g or more, more preferably 120 m$^2$/g or more, but preferably 190 m$^2$/g or less, more preferably 180 m$^2$/g or less. When the N$_2$SA is within the range indicated above, the advantageous effect tends to be more suitably achieved.

These types of silica (the fine particle silica, additional type of silica different from the fine particle silica) may be commercially available from Degussa, Rhodia, Tosoh Silica Corporation, Solvay Japan, Tokuyama Corporation, etc.

The total silica content (parts by mass) or the total amount of silica per 100 parts by mass of the rubber component is preferably 10 parts by mass or higher, more preferably 40 parts by mass or higher, still more preferably 60 parts by mass or higher, particularly preferably 70 parts by mass or higher, most preferably 75 parts by mass or higher, further preferably 80 parts by mass or higher, further preferably 90 parts by mass or higher, further preferably 95 parts by mass or higher, but is preferably 120 parts by mass or lower, more preferably 115 parts by mass or lower, still more preferably 110 parts by mass or lower, particularly preferably 105 parts by mass or lower, most preferably 102 parts by mass or lower, further preferably 100 parts by mass or lower, further preferably 99 parts by mass or lower, further preferably 97 parts by mass or lower. When the total silica content is within the range indicated above, the advantageous effect tends to be more suitably achieved.

In the rubber composition, the amount of silica based on 100% by mass of fillers (reinforcing fillers) is preferably 30% by mass or more, more preferably 50% by mass or more, still more preferably 70% by mass or more, particularly preferably 90% by mass or more, and may be 100% by mass. When the amount is within the range indicated above, the advantageous effect tends to be more suitably achieved.

The rubber composition containing silica preferably further contains a silane coupling agent.

Any silane coupling agent may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane Coupling agents such as 3-mercaptopropyltrimethoxysilane and 2-mercaptoethyltriethoxysilane; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Commercial products available from Degussa, Momentive, Shin-Etsu Silicone, Tokyo Chemical Industry Co., Ltd., AZmax. Co., Dow Corning Toray Co., Ltd., etc. may be used. These may be used alone or in combinations of two or more. Among these, sulfide and mercapto silane coupling agents are preferred, with mercapto silane coupling agents being more preferred, because then the advantageous effect tends to be better achieved.

Examples of particularly suitable mercapto silane coupling agents are silane coupling agents containing linking units A and B represented by the formulas (I) and (II) below, respectively.

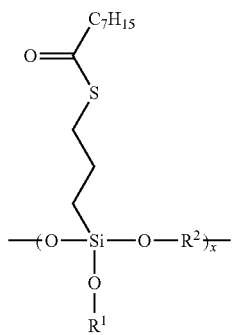

(I)

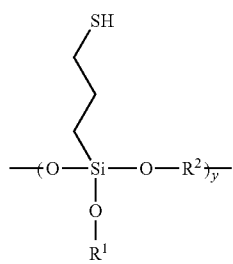

(II)

In the formulas, x represents an integer of 0 or larger; y represents an integer of 1 or larger; $R^1$ represents a hydrogen atom, a halogen atom, a branched or unbranched C1-C30 alkyl group, a branched or unbranched C2-C30 alkenyl group, a branched or unbranched C2-C30 alkynyl group, or the alkyl group in which a terminal hydrogen atom is replaced with a hydroxy or carboxyl group; and $R^2$ represents a branched or unbranched C1-C30 alkylene group, a branched or unbranched C2-C30 alkenylene group, or a branched or unbranched C2-C30 alkynylene group, provided that $R^1$ and $R^2$ may together form a cyclic structure.

The linking unit A content of the silane coupling agents containing linking units A and B of formulas (I) and (II) is preferably 30 mol % or higher, more preferably 50 mol % or higher, but is preferably 99 mol % or lower, more preferably 90 mol % or lower, while the linking unit B content is preferably 1 mol % or higher, more preferably 5 mol % or higher, still more preferably 10 mol % or higher, but is preferably 70 mol % or lower, more preferably 65 mol % or lower, still more preferably 55 mol % or lower. Moreover, the combined content of the linking units A and B is preferably 95 mol % or higher, more preferably 98 mol % or higher, particularly preferably 100 mol %.

The linking unit A or B content refers to the amount including the linking unit A or B present at the end of the silane coupling agent, if any. When the linking unit A or B is present at the end of the silane coupling agent, it may have any form that forms a unit corresponding to formula (I) or (II) representing the linking unit A or B.

With regard to $R^1$ in formulas (I) and (II), examples of the halogen atom include chlorine, bromine, and fluorine; examples of the branched or unbranched C1-C30 alkyl group include methyl and ethyl groups; examples of the branched or unbranched C2-C30 alkenyl group include vinyl and 1-propenyl groups; and examples of the branched or unbranched C2-C30 alkynyl group include ethynyl and propynyl groups.

With regard to $R^2$ in formulas (I) and (II), examples of the branched or unbranched C1-C30 alkylene group include ethylene and propylene groups; examples of the branched or unbranched C2-C30 alkenylene group include vinylene and 1-propenylene groups; and examples of the branched or unbranched C2-C30 alkynylene group include ethynylene and propynylene groups.

In the silane coupling agents containing linking units A and B of formulas (I) and (II), the total number of repetitions (x+y) consisting of the sum of the number of repetitions (x) of the linking unit A and the number of repetitions (y) of the linking unit B is preferably in the range of 3 to 300.

The amount of the silane coupling agent per 100 parts by mass of the silica is preferably 0.5 parts by mass or more, more preferably 3 parts by mass or more, still more preferably 5 parts by mass or more, but is preferably 20 parts by mass or less, more preferably 15 parts by mass or less, still more preferably 10 parts by mass or less. When the amount is within the range indicated above, the advantageous effect tends to be better achieved.

The rubber composition contains a softener. Any softener may be used, and examples include oils, liquid diene polymers, resins, and ester plasticizers. These may be used alone or in combinations of two or more. Oils and resins are preferred among these.

Examples of oils include process oils, vegetable oils, and mixtures thereof. Examples of process oils include paraffinic process oils, aromatic process oils, and naphthenic process oils. Examples of vegetable oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone or in combinations of two or more. Process oils are preferred among these, with aromatic process oils being more preferred, because then the advantageous effect can be well achieved.

The oils may be commercially available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

Liquid diene polymers refer to diene polymers that are liquid at room temperature (25° C.)

The weight average molecular weight (Mw) of the liquid diene polymers is preferably $3.0 \times 10^3$ or more, more preferably $4.0 \times 10^3$ or more, but is preferably $1.0 \times 10^5$ or less, more preferably $1.5 \times 10^4$ or less. When the Mw is within the range indicated above, the advantageous effect can be more suitably achieved.

Examples of liquid diene polymers include liquid styrene-butadiene copolymers (liquid SBR), liquid polybutadiene polymers (liquid BR), liquid polyisoprene polymers (liquid IR), and liquid styrene-isoprene copolymers (liquid SIR). These may be used alone or in combinations of two or more. Among these, liquid SBR is preferred in order to more suitably achieve the advantageous effect.

The styrene content of the liquid SBR is preferably 10% by mass or higher, more preferably 20% by mass or higher, still more preferably 30% by mass or higher, but is preferably 55% by mass or lower, more preferably 50% by mass or lower. When the styrene content is within the range indicated above, the advantageous effect can be more suitably achieved.

The liquid diene polymers may be commercially available from Sartomer, Kuraray Co., Ltd., etc.

Any resin generally used in the tire industry may be used. Examples include rosin-based resins, coumarone-indene resins, α-methylstyrene-based resins, terpene-based resins, p-t-buthylphenol acetylene resins, acrylic resins, C5 resins, and C9 resins. Commercial products available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., Toagosei Co., Ltd., etc. may be used. These may be used alone or in combinations of two or more. Preferred among these are α-methylstyrene-based resins. Examples of α-methylstyrene-based resins include α-methylstyrene homopolymers and copolymers of α-methylstyrene and styrene, among which copolymers of α-methylstyrene and styrene are preferred.

The softening point of the resins is preferably −45° C. or higher, more preferably 0° C. or higher, still more preferably 30° C. or higher, particularly preferably 60° C. or higher, most preferably 80° C. or higher. Moreover, the upper limit of the softening point is not limited, but is preferably 180° C. or lower, more preferably 160° C. or lower, still more preferably 140° C. or lower, particularly preferably 120° C. or lower. When the softening point is within the range indicated above, the advantageous effect tends to be more suitably achieved.

The softening point of the resins is determined as set forth in JIS K 6220-1:2001 with a ring and ball softening point measuring apparatus and defined as the temperature at which the ball drops down.

The resins may be commercially available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., etc.

Examples of ester plasticizers include the above-mentioned vegetable oils; synthetic plasticizers and processed vegetable oils, such as glycerol fatty acid monoesters, glycerol fatty acid diesters, and glycerol fatty acid triesters; and phosphoric acid esters (e.g., phosphate plasticizers and mixtures thereof). These may be used alone or in combinations of two or more.

The total softener content (parts by mass) or the total amount of softeners per 100 parts by mass of the rubber component is preferably 5 parts by mass or higher, more preferably 10 parts by mass or higher, still more preferably 15 parts by mass or higher, particularly preferably 20 parts by mass or higher, most preferably 25 parts by mass or higher, further preferably 30 parts by mass or higher, further preferably 33 parts by mass or higher, further preferably 34 parts by mass or higher, further preferably 35 parts by mass or higher, further preferably 36 parts by mass or higher, further preferably 37 parts by mass or higher, but is preferably 70 parts by mass or lower, more preferably 65 parts by mass or lower, still more preferably 60 parts by mass or lower, particularly preferably 55 parts by mass or lower, most preferably 50 parts by mass or lower, further preferably 45 parts by mass or lower, further preferably 40 parts by mass or lower, per 100 parts by mass of the rubber component. When the total softener content is within the range indicated above, the advantageous effect tends to be better achieved.

The rubber composition may contain carbon black. In this case, the advantageous effect tends to be better achieved.

Any carbon black may be used, and examples include N134, N110, N220, N234, N219, N339, N330, N326, N351, N550, and N762. These may be used alone or in combinations of two or more.

The carbon black preferably has a nitrogen adsorption specific surface area ($N_2SA$) of 30 $m^2/g$ or more, more preferably 80 $m^2/g$ or more, still more preferably 100 $m^2/g$ or more, but preferably 200 $m^2/g$ or less, more preferably 150 $m^2/g$ or less. When the $N_2SA$ is within the range indicated above, the advantageous effect tends to be better achieved.

Herein, the $N_2SA$ of the carbon black is measured in accordance with JIS K6217-2:2001.

The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of the carbon black per 100 parts by mass of the rubber component is preferably 1 part by mass or more, more preferably 3 parts by mass or more, but is preferably 50 parts by mass or less, more preferably 30 parts by mass or less, still more preferably 10 parts by mass or less. When the amount is within the range indicated above, the advantageous effect tends to be better achieved.

The rubber composition may contain aluminum hydroxide. This tends to provide better wet grip performance and fuel economy.

The aluminum hydroxide preferably has a nitrogen adsorption specific surface area ($N_2SA$) of 3 to 60 m$^2$/g. The lower limit of the $N_2SA$ is preferably 6 m$^2$/g or more, more preferably 12 m$^2$/g or more, while the upper limit is preferably 50 m$^2$/g or less, more preferably 40 m$^2$/g or less, still more preferably 20 m$^2$/g or less. When the $N_2SA$ is within the range indicated above, the advantageous effect tends to be better achieved. Herein, the $N_2SA$ of the aluminum hydroxide is measured by the BET method in accordance with ASTM D3037-81.

The amount of the aluminum hydroxide per 100 parts by mass of the rubber component is preferably 3 parts by mass or more, more preferably 5 parts by mass or more, but is preferably 50 parts by mass or less, more preferably 20 parts by mass or less, still more preferably 10 parts by mass or less. When the amount is within the range indicated above, the advantageous effect tends to be more suitably achieved.

The rubber composition preferably contains sulfur as a crosslinking agent (vulcanizing agent).

Examples of such sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of the sulfur per 100 parts by mass of the rubber component is preferably 0.1 parts by mass or more, more preferably 0.5 parts by mass or more, but is preferably 5 parts by mass or less, more preferably 3 parts by mass or less. When the amount is within the range indicated above, the advantageous effect tends to be better achieved.

The rubber composition preferably contains a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more. Preferred among these are sulfenamide and/or thiuram vulcanization accelerators, with combinations of sulfenamide and thiuram vulcanization accelerators being more preferred.

The vulcanization accelerator may be commercially available from Kawaguchi Chemical Industry Co., Ltd., Ouchi Shinko Chemical Industrial Co., Ltd., Rhein Chemie, etc.

The amount of the vulcanization accelerator per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain a wax.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more. Among these, petroleum waxes are preferred, and paraffin waxes are more preferred.

The wax may be commercially available from Ouchi Shinko Chemical Industrial Co., Ltd., Nippon Seiro Co., Ltd., Seiko Chemical Co., Ltd., etc.

The amount of the wax per 100 parts by mass of the rubber component is preferably 0.3 parts by mass or more, more preferably 0.5 parts by mass or more, but is preferably 20 parts by mass or less, more preferably 10 parts by mass or less. When the amount is within the range indicated above, the advantageous effect tends to be better achieved.

The rubber composition may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis [methylene-3-(3',5'-di-t-butyl-4'-hydroxyphenyl)propionate]methane. These may be used alone or in combinations of two or more. Preferred among these are p-phenylenediamine and quinoline antioxidants.

The antioxidant may be commercially available from Seiko Chemical Co., Ltd., Sumitomo Chemical Co., Ltd., Ouchi Shinko Chemical Industrial Co., Ltd., Flexsys, etc.

The amount of the antioxidant per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain stearic acid.

The stearic acid may be a conventional one, e.g., available from NOF Corporation, Kao Corporation, FUJIFILM Wako Pure Chemical Corporation, or Chiba Fatty Acid Co., Ltd.

The amount of the stearic acid per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

The rubber composition may contain zinc oxide.

The zinc oxide may be a conventional one, e.g., available from Mitsui Mining & Smelting Co., Ltd., Toho Zinc Co., Ltd., Hakusui Tech Co., Ltd., Seido Chemical Industry Co., Ltd., or Sakai Chemical Industry Co., Ltd.

The amount of the zinc oxide per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the advantageous effect tends to be better achieved.

In addition to the above-described components, the rubber composition may further contain additives commonly used in the tire industry, including, for example, organic peroxides; and fillers such as calcium carbonate, talc, alumina, clay, and mica. The amount of each of such additives is preferably 0.1 to 200 parts by mass per 100 parts by mass of the rubber component.

The rubber composition may be prepared, for example, by kneading the components in a rubber kneading machine such as an open roll mill or a Banbury mixer, and then vulcanizing the kneaded mixture.

The kneading conditions are as follows. In a base kneading step of kneading additives other than vulcanizing agents and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably from 80 to 110° C. The composition obtained after kneading vulcanizing agents and vulcanization accelerators is usually vulcanized by press vulcanization, for example. The vulcanization temperature is usually 130 to 190° C., preferably 150 to 185° C. The vulcanization time is usually 5 to 30 minutes.

The rubber composition may be used in tire components (i.e., as a rubber composition for tires), including treads (cap treads). For use in a tread including a cap tread and a base tread, the rubber composition can be suitably used in the cap tread.

The tires (e.g., pneumatic tires, solid tires, airless tires) of the present invention may be produced from the above-described rubber composition by usual methods. Specifically, the unvulcanized rubber composition containing additives as needed may be extruded into the form of a tire tread (cap tread) and then formed and assembled with other tire components in a usual manner in a tire building machine to build an unvulcanized tire, which may then be heated and pressurized in a vulcanizer to produce a tire.

The tires include a tread which at least partially includes the rubber composition. The entire tread may include the rubber composition.

The tires can be suitably used as tires for passenger cars, tires for large passenger cars, tires for large SUV, tires for trucks and buses, tires for two-wheeled vehicles, racing tires, winter tires (studless winter tires, snow tires, studded tires), all-season tires, run-flat tires, aircraft tires, mining tires, etc. The tires are particularly suitable for use as tires for passenger cars.

EXAMPLES

The present invention is specifically described with reference to, but not limited to, examples.

The chemicals used in the examples and comparative examples are listed below.

SBR: SBR produced in the production example described below (non-oil extended, styrene content: 26% by mass)

BR: Ubepol BR150B (cis content: 98% by mass) available from Ube Industries, Ltd.

Silica 1: 9000Gr ($N_2SA$: 235 m$^2$/g) available from Degussa

Silica 2: VN3 ($N_2SA$: 165 m$^2$/g) available from Degussa

Carbon black: N220 ($N_2SA$: 114 m$^2$/g) available from Mitsubishi Chemical Corporation Silane coupling agent: NXT-Z45 (a copolymer of linking units A and B, linking unit A: 55 mol %, linking unit B: 45 mol %) available from Momentive Oil: X-140 (aromatic process oil) available from Japan Energy Corporation Resin: Sylvatraxx 4401 (a copolymer of α-methylstyrene and styrene, softening point: 85° C., Tg: 43° C.) available from Arizona Chemical Wax: SUNNOC N available from Ouchi Shinko Chemical Industrial Co., Ltd.

Antioxidant 1: NOCRAC 6C (N-(1,3-dimethylbutyl)-N'-phenyl-p-phenylenediamine, 6PPD) available from Ouchi Shinko Chemical Industrial Co., Ltd.

Antioxidant 2: NOCRAC 224 (quinoline antioxidant, 2,2,4-trimethyl-1,2-dihydroquinoline polymer) available from Ouchi Shinko Chemical Industrial Co., Ltd.

Stearic acid: TSUBAKI available from NOF Corporation

Zinc oxide: zinc oxide #2 available from Mitsui Mining & Smelting Co., Ltd.

Sulfur: powdered sulfur available from Tsurumi Chemical Industry Co., Ltd.

Vulcanization accelerator 1: NOCCELER CZ (N-cyclohexyl-2-benzothiazolylsulfenamide) available from Ouchi Shinko Chemical Industrial Co., Ltd.

Vulcanization accelerator 2: TBzTD (tetrabenzylthiuram disulfide) available from Sanshin Chemical Industry Co., Ltd.

Production Example 1

A nitrogen-purged autoclave reactor was charged with cyclohexane, tetrahydrofuran, styrene, and 1,3-butadiene. The temperature of the contents of the reactor was adjusted to 20° C., and then n-butyllithium was added thereto to initiate polymerization. The polymerization was carried out under adiabatic conditions, and the maximum temperature reached 85° C. Once the polymerization conversion ratio reached 99%, butadiene was added, followed by polymerization for five minutes. Subsequently, 3-dimethylaminopropyltrimethoxysilane was added as a modifier, and a reaction was carried out for 15 minutes. After completion of the polymerization reaction, 2,6-di-tert-butyl-p-cresol was added. Thereafter, the solvent was removed by steam stripping. The product was dried on hot rolls adjusted at 110° C. to obtain a modified styrene-butadiene rubber (SBR).

Examples and Comparative Examples

According to the formulation shown in Table 1, 75 parts by mass of the SBR, 25 parts by mass of the BR, the silica in an amount shown in Table 1, 5 parts by mass of the carbon black, the silane coupling agent in an amount of 10 parts by mass per 100 parts by mass of the silica, the oil in an amount shown in Table 1, the resin in an amount shown in Table 1, 2 parts by mass of the wax, 2 parts by mass of the antioxidant 1, 2 parts by mass of the antioxidant 2, 1 part by mass of the stearic acid, and 1.5 parts by mass of the zinc oxide were kneaded at 130° C. for four minutes in a 1.7 L Banbury mixer (Kobe Steel Co., Ltd.) to give a kneaded mixture. To the kneaded mixture were added 1 part by mass of the surfer, 2 parts by mass of the vulcanization accelerator 1, and 2 parts by mass of the vulcanization accelerator 2, and they were kneaded at 80° C. for four minutes in an open roll mill to give an unvulcanized rubber composition.

The unvulcanized rubber composition was extruded into the form of a tread and assembled with other tire components in a tire building machine to build an unvulcanized tire. The unvulcanized tire was press-vulcanized at 130° C. for 10 minutes to prepare a test tire (tire size: 205/55R16). The tire had a main groove depth shown in Table 1 and a main groove width (width in the tire width direction) of 10 mm.

The test tires prepared as above were evaluated for the following items. Table 1 shows the results.

<Handling Stability>

The test tires were mounted on each wheel of a front-engine, front-wheel-drive car of 2000 cc displacement made in Japan. A driver drove the car in a zig-zag fashion on a test track and subjectively evaluated handling stability. The driver also evaluated handling stability immediately after the start of the test and 30 minutes later. The handling stability results were evaluated relative to Comparative Example 1, which was assigned a score of 100. A higher score indicates better handling stability.

<Fuel Economy>

The rolling resistance of the test tires was measured using a rolling resistance tester by running them at an internal pressure of 230 kPa and a speed of 80 km/h. The rolling resistances are expressed as an index, with the reference comparative example set equal to 100. A higher index indicates better fuel economy. An index of 90 or higher was considered to represent good performance.

<Wet Grip Performance>

The test tires were mounted on each wheel of a front-engine, front-wheel-drive car of 2000 cc displacement made in Japan, and the braking distance from an initial speed of 100 km/h on a wet asphalt road was determined. The results are expressed as an index, with the reference comparative example set equal to 100. A higher index indicates better wet grip performance. The index was calculated using the following equation.

Wet grip performance index=(Braking distance of Comparative Example 1)/(Braking distance of each example or comparative example)×100

<Life Performance>

The test tires were mounted on each wheel of a front-engine, front-wheel-drive car of 2000 cc displacement made in Japan, and the car was driven. The change in the depth of pattern grooves after 35,000 km driving was determined. The results are expressed as an index, with the reference comparative example set equal to 100. A higher index indicates better life performance. An index of 95 or higher was considered to represent good performance.

TABLE 1

|  |  | Comp. Ex. 1 | Comp. Ex. 2 | Comp. Ex. 3 | Ex. 1 | Ex. 2 | Ex. 3 | Ex. 4 | Ex. 5 | Ex. 6 | Ex. 7 |
|---|---|---|---|---|---|---|---|---|---|---|---|
| Silica 1 (9000Gr) | parts by mass |  | 70 | 110 | 70 | 80 | 90 | 85 | 70 | 100 | 70 |
| Silica 2 (VN3) | parts by mass | 70 |  |  |  |  |  |  | 5 |  |  |
| Total silica content | parts by mass | 70 | 70 | 110 | 70 | 80 | 90 | 90 | 70 | 100 | 70 |
| Oil | parts by mass | 20 | 40 | 35 | 20 | 30 | 40 | 35 | 25 | 30 | 35 |
| Resin | parts by mass | 5 | 5 | 5 | 5 | 5 | 5 | 5 | 5 | 5 | 5 |
| Total softener content | parts by mass | 25 | 45 | 40 | 25 | 35 | 45 | 40 | 30 | 35 | 40 |
| Main groove depth | mm | 7.5 | 7.5 | 4.0 | 7.5 | 6.5 | 5.5 | 6.0 | 7.5 | 5.5 | 7.0 |
| Value of relationship (A) |  | 0.37 | 0.21 | 0.69 | 0.37 | 0.35 | 0.36 | 0.38 | 0.31 | 0.52 | 0.25 |
| Handling stability index |  | 100 | 97 | 95 | 105 | 107 | 110 | 109 | 104 | 112 | 105 |
| Fuel economy index |  | 100 | 98 | 97 | 99 | 98 | 97 | 96 | 98 | 94 | 103 |
| Wet grip performance index |  | 100 | 105 | 108 | 105 | 109 | 112 | 112 | 108 | 115 | 106 |
| Life performance index |  | 100 | 97 | 88 | 115 | 105 | 97 | 98 | 113 | 99 | 105 |
| Average of indexes |  | 100 | 99 | 97 | 106 | 105 | 104 | 104 | 106 | 105 | 105 |

|  |  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Silica 1 (9000Gr) | parts by mass | 75 | 90 | 95 | 95 | 97 | 99 | 102 | 105 | 105 |
| Silica 2 (VN3) | parts by mass |  |  |  |  |  |  |  |  |  |
| Total silica content | parts by mass | 75 | 90 | 95 | 95 | 97 | 99 | 102 | 105 | 105 |
| Oil | parts by mass | 33 | 32.5 | 35 | 33 | 32 | 31 | 30 | 29 | 28 |
| Resin | parts by mass | 5 | 5 | 5 | 5 | 5 | 5 | 5 | 5 | 5 |
| Total softener content | parts by mass | 38 | 37.5 | 40 | 38 | 37 | 36 | 35 | 34 | 33 |
| Main groove depth | mm | 7.0 | 6.0 | 5.5 | 5.5 | 5.5 | 5.5 | 5.5 | 5.5 | 5.3 |
| Value of relationship (A) |  | 0.28 | 0.40 | 0.43 | 0.45 | 0.48 | 0.50 | 0.53 | 0.56 | 0.60 |
| Handling stability index |  | 107 | 113 | 112 | 112 | 113 | 114 | 115 | 116 | 114 |
| Fuel economy index |  | 100 | 95 | 97 | 98 | 97 | 96 | 94 | 94 | 96 |

TABLE 1-continued

| | | | | | | | | | |
|---|---|---|---|---|---|---|---|---|---|
| Wet grip performance index | 106 | 111 | 115 | 113 | 112 | 113 | 115 | 114 | 111 |
| Life performance index | 110 | 104 | 103 | 104 | 105 | 102 | 100 | 100 | 97 |
| Average of indexes | 106 | 106 | 107 | 107 | 107 | 106 | 106 | 106 | 105 |

Ex.: Example
Comp. Ex.: Comparative Example

Table 1 shows that the overall performance in terms of fuel economy, life performance, wet grip performance, and handling stability (expressed as the average of the four indexes: fuel economy, life performance, wet grip performance, and handling stability) was improved in the tires of the examples including a tread which contained a rubber component, a silica having a nitrogen adsorption specific surface area of 200 m²/g or more, and a softener and which satisfied relationship (A).

The invention claimed is:

1. A tire, comprising a tread,
the tread comprising:
a rubber component comprising styrene-butadiene rubber (SBR) and polybutadiene rubber (BR);
a silica having a nitrogen adsorption specific surface area of 200 m²/g or more; and
a softener comprising:
at least one selected from the group consisting of rosin-based resins, coumarone-indene resins, alpha-methylstyrene-based resins, p-t-butylphenol acetylene resins, acrylic resins, C5 resins, and C9 resins, and
oil in an amount of 28 to 40 parts by mass per 100 parts by mass of the rubber component,
the tread satisfying the following relationship (A):

0.25≤total silica content (parts by mass)/(total softener content (parts by mass)×main groove depth (mm))≤0.60, wherein the total amount of softener is from 30 to 45 parts by mass per 100 parts by mass of the rubber component,
the main groove depth is from 5.3 to 7.5 mm, and
the tread does not include terpene resin.
2. The tire according to claim 1,
wherein the upper limit in relationship (A) is 0.55 or lower.
3. The tire according to claim 1,
wherein the upper limit in relationship (A) is 0.50 or lower.
4. The tire according to claim 1,
wherein the upper limit in relationship (A) is 0.48 or lower.
5. The tire according to claim 1,
wherein the lower limit in relationship (A) is 0.30 or higher.
6. The tire according to claim 1,
wherein the lower limit in relationship (A) is 0.35 or higher.
7. The tire according to claim 1,
wherein the lower limit in relationship (A) is 0.43 or higher.
8. The tire according to claim 1,
wherein the main groove depth is from 5.3 to 6.5 mm.
9. The tire according to claim 1,
wherein the main groove depth is from 5.3 to 5.5 mm.
10. The tire according to claim 1,
wherein the total silica content is 70 parts by mass or higher per 100 parts by mass of the rubber component.
11. The tire according to claim 1,
wherein the total silica content is 80 parts by mass or higher per 100 parts by mass of the rubber component.
12. The tire according to claim 1,
wherein the total silica content is 90 parts by mass or higher per 100 parts by mass of the rubber component.

* * * * *